(12) United States Patent
Ra

(10) Patent No.: US 11,327,377 B2
(45) Date of Patent: May 10, 2022

(54) DISPLAY DEVICE AND REPAIRING METHOD THEREOF

(71) Applicant: Samsung Display Co., Ltd., Yongin-si (KR)

(72) Inventor: Yoo Mi Ra, Ansan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 64 days.

(21) Appl. No.: 16/601,450

(22) Filed: Oct. 14, 2019

(65) Prior Publication Data

US 2020/0301218 A1 Sep. 24, 2020

(30) Foreign Application Priority Data

Mar. 21, 2019 (KR) .................... 10-2019-0032345

(51) Int. Cl.
*G02F 1/1362* (2006.01)
*G02F 1/1368* (2006.01)

(52) U.S. Cl.
CPC ...... *G02F 1/136259* (2013.01); *G02F 1/1368* (2013.01); *G02F 1/136213* (2013.01);
(Continued)

(58) Field of Classification Search
CPC ............. G02F 1/136259; G02F 1/1368; G02F 1/136286; G02F 1/136213; G02F 1/134336; G02F 1/136268; G02F 1/13606; G02F 1/136263; G02F 1/13629; G02F 1/136272; G02F 1/136222; G02F 1/134363; G02F 1/1309; G02F 1/134345; G09G 3/3225;
(Continued)

(56) References Cited

U.S. PATENT DOCUMENTS

2003/0193638 A1* 10/2003 Masutani .......... G02F 1/134363
349/141
2009/0268119 A1* 10/2009 Lee ..................... H01L 27/1259
349/54
(Continued)

FOREIGN PATENT DOCUMENTS

KR       2000-0003113 A    1/2000
KR   10-2006-0125310 A   12/2006
(Continued)

*Primary Examiner* — Mouloucoulaye Inoussa

(74) *Attorney, Agent, or Firm* — Lewis Roca Rothgerber Christie LLP

(57) ABSTRACT

A display device includes: a pixel electrode; and a storage electrode line surrounding the pixel electrode. The storage electrode line includes a first horizontal portion at a lower portion of the pixel electrode and extending in a first direction, a second horizontal portion at an upper portion of the pixel electrode and extending in the first direction, a first vertical portion extending toward the second horizontal portion from the first horizontal portion, and a second vertical portion extending toward the first horizontal portion from the second horizontal portion. The first horizontal portion and the second horizontal portion are electrically connected to each other and receive a same voltage, and the first vertical portion is not directly connected to the second horizontal portion, and/or the second vertical portion is not directly connected to the first horizontal portion.

15 Claims, 8 Drawing Sheets

(52) U.S. Cl.
CPC .. *G02F 1/136286* (2013.01); *G02F 1/136222* (2021.01); *G02F 1/136263* (2021.01); *G02F 2201/121* (2013.01); *G02F 2201/123* (2013.01); *G02F 2201/52* (2013.01)

(58) Field of Classification Search
CPC .. G09G 3/3648; G09G 3/3233; G09G 3/3614; G09G 3/3659; H01L 27/3276; H01L 27/1259; H01L 27/124; H01L 27/3213; H01L 27/1214; H01L 21/268
USPC ............ 349/143, 54, 192, 55, 139, 141, 43; 345/76; 257/71; 438/4
See application file for complete search history.

(56) References Cited

U.S. PATENT DOCUMENTS

| | | | | |
|---|---|---|---|---|
| 2010/0201903 | A1* | 8/2010 | Huang | G02F 1/136259 349/55 |
| 2011/0122353 | A1* | 5/2011 | Tsubata | G02F 1/134336 349/143 |
| 2013/0329158 | A1* | 12/2013 | Kanamori | G02F 1/136213 349/43 |
| 2016/0260376 | A1* | 9/2016 | Shin | G09G 3/3225 |

FOREIGN PATENT DOCUMENTS

| | | |
|---|---|---|
| KR | 10-2007-0036915 A | 4/2007 |
| KR | 10-2008-0079888 A | 9/2008 |
| KR | 10-1874789 B1 | 7/2018 |

* cited by examiner

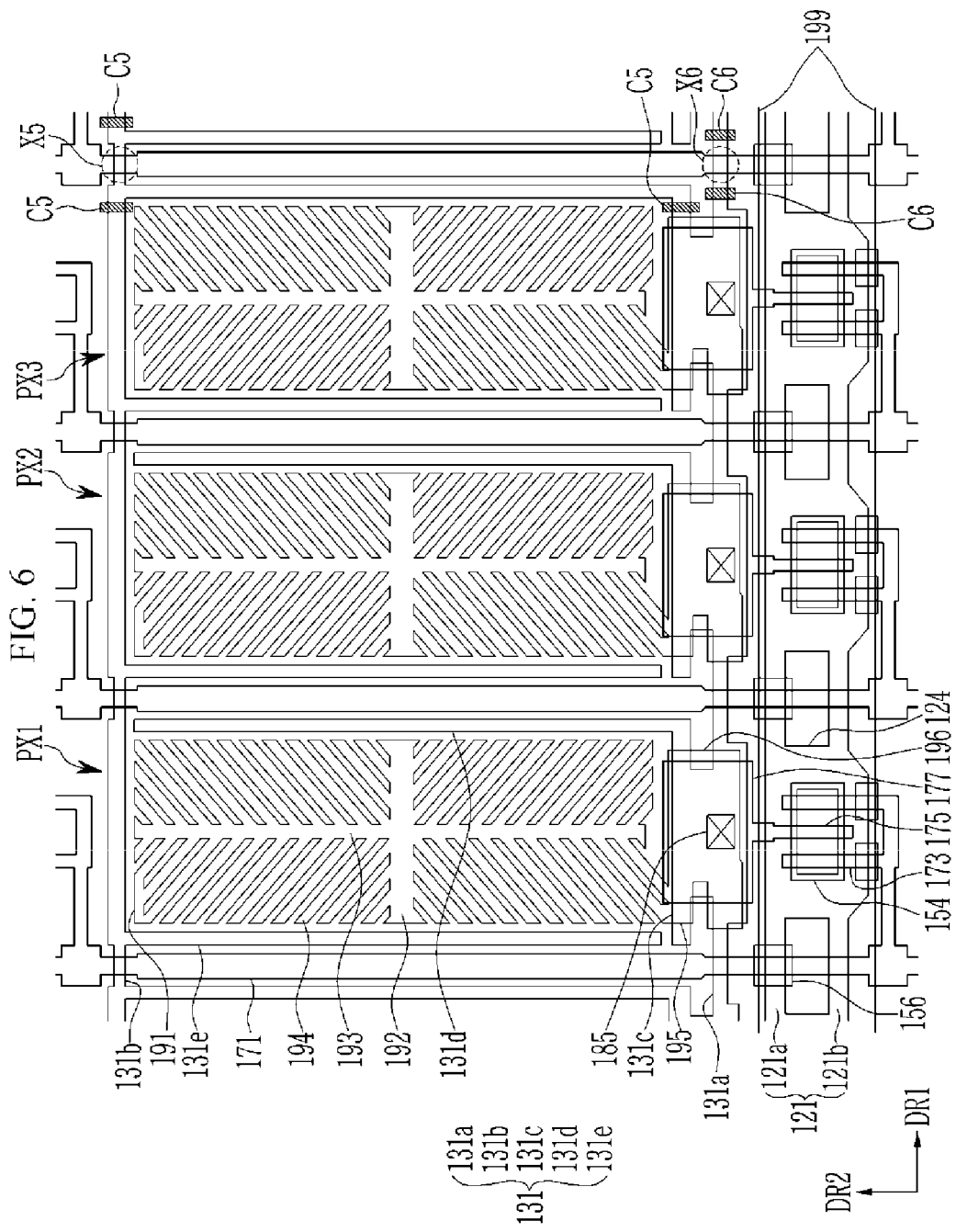

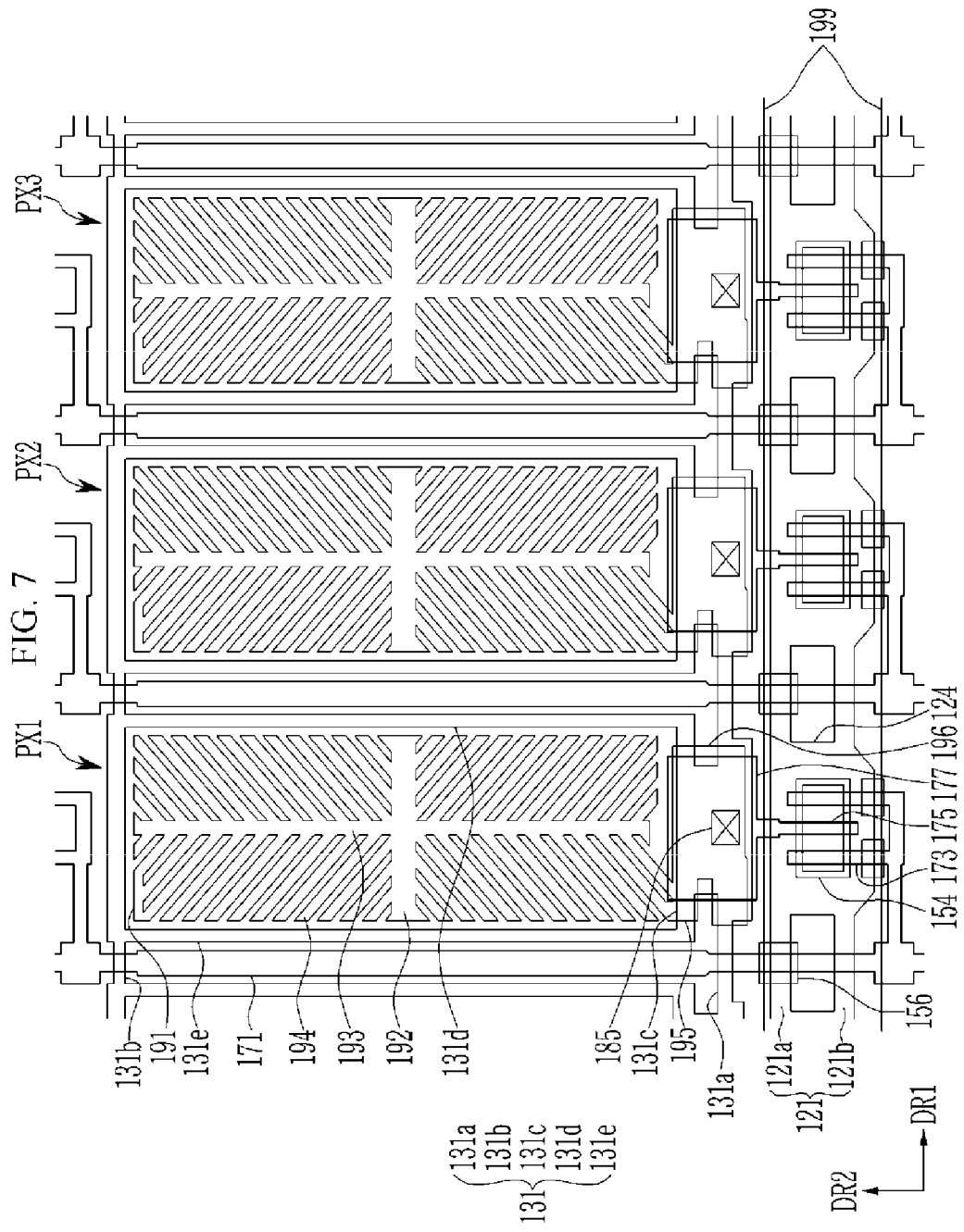

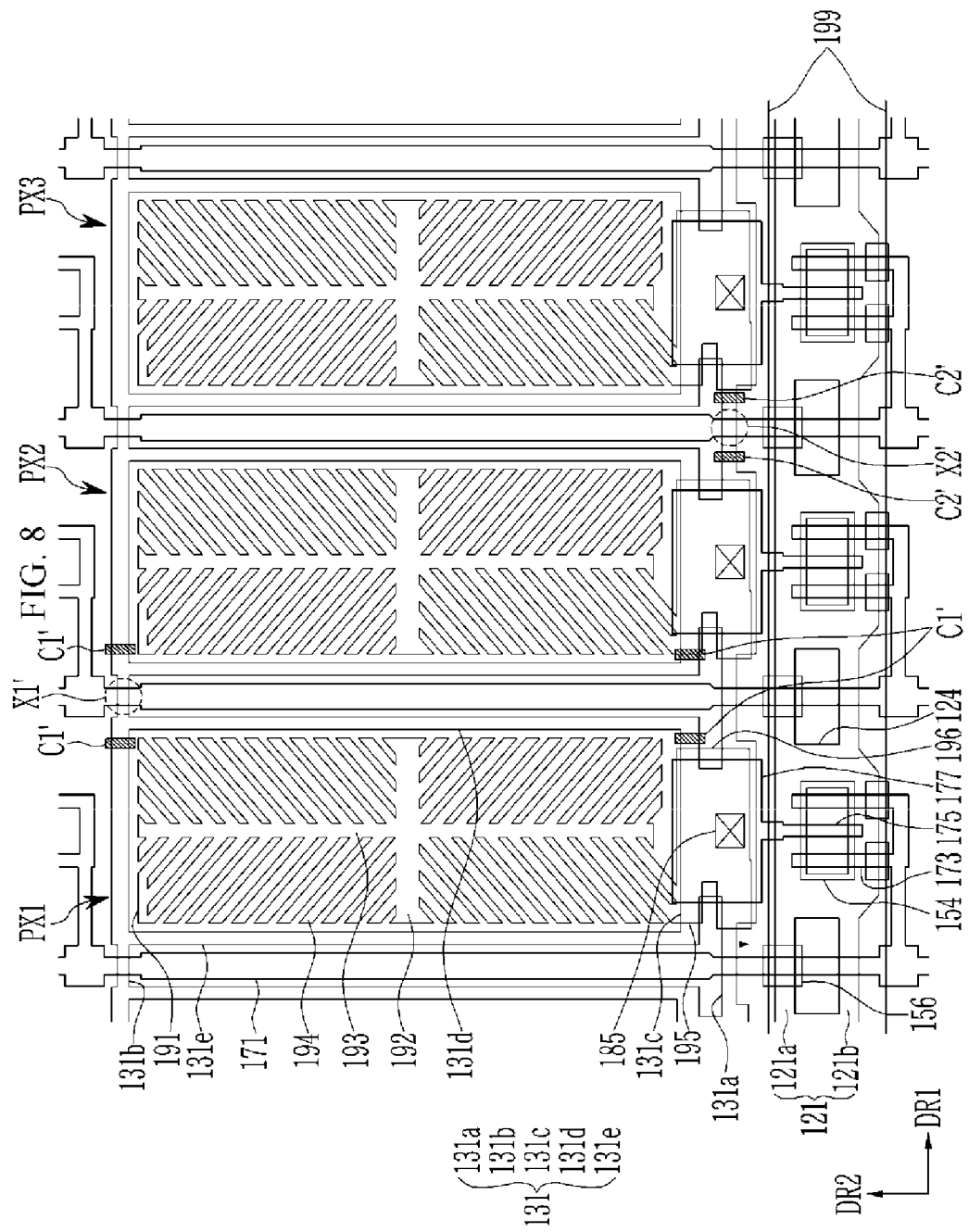

DISPLAY DEVICE AND REPAIRING METHOD THEREOF

CROSS-REFERENCE TO RELATED APPLICATION

This application claims priority to and the benefit of Korean Patent Application No. 10-2019-0032345, filed in the Korean Intellectual Property Office on Mar. 21, 2019, the entire content of which is incorporated herein by reference.

BACKGROUND

1. Field

Embodiments of the present invention relate to a display device and a repairing method thereof. More particularly, embodiments of the present invention relate to a display device for fixing or solving a short circuit defect among wires, and a repair method thereof.

2. Description of the Related Art

A liquid crystal display is a type of display device that is in great use. The liquid crystal display includes a display panel on which an electrode is formed and a liquid crystal layer, and the liquid crystal display rearranges liquid crystal molecules of the liquid crystal layer by applying a voltage to an electrode and forming an electric field, and displays an image by controlling transmittance.

A plurality of pixel electrodes, gate lines, data lines, and storage electrode lines may be formed on the display panel. A gate signal may be applied to a plurality of pixels through a gate line, a data voltage may be applied to a plurality of pixels through a data line, and a common voltage may be applied to a plurality of pixels through a storage electrode line.

The wires may be disposed to cross each other on the display panel, and a short circuit among the wires may be generated. When a short circuit is generated among different wires, a defect causing the display device to fail to display an image may be generated.

The above information disclosed in this Background section is only for enhancement of understanding of the background of the invention and therefore it may contain information that does not form the prior art that is already known in this country to a person of ordinary skill in the art.

SUMMARY

Aspects of embodiments of the present invention are directed toward a display device for fixing or solving a short circuit defect generated among wires crossing each other on a display panel, and a repairing method thereof.

Aspects of embodiments of the present invention are directed toward a display device for fixing or solving a short circuit defect between a data line and a storage electrode line, and a repairing method thereof.

An exemplary embodiment of the present invention provides a display device including: a pixel electrode; and a storage electrode line arranged to surround the pixel electrode, wherein the storage electrode line includes a first horizontal portion arranged at or near a lower portion of the pixel electrode and extending in a first direction, a second horizontal portion arranged at or near an upper portion of the pixel electrode and extending in the first direction, a first vertical portion extending toward the second horizontal portion from the first horizontal portion, and a second vertical portion extending toward the first horizontal portion from the second horizontal portion, wherein the first horizontal portion and the second horizontal portion are electrically connected to each other and receive a same voltage, and the first vertical portion is not directly connected to the second horizontal portion, and/or the second vertical portion is not directly connected to the first horizontal portion.

When the pixel electrode is a pixel electrode of a blue pixel, the first vertical portion may be directly connected to the second horizontal portion, and the second vertical portion may not be directly connected to the first horizontal portion.

The display device may further include: a data line crossing the first horizontal portion and the second horizontal portion; a short-circuited point at which the data line and the storage electrode line are short circuited and at where the data line crosses the first horizontal portion; and an incised point at which the first horizontal portion is incised on respective sides of the short-circuited point.

The display device may further include: a data line crossing the first horizontal portion and the second horizontal portion; a short-circuited point at which the data line and the storage electrode line are short circuited and at where the data line crosses the second horizontal portion; and an incised point at which the second horizontal portion is incised on respective sides of the short-circuited point and the first vertical portion is incised from the first horizontal portion.

When the pixel electrode is a pixel electrode of a red pixel or a green pixel, the first vertical portion may not be directly connected to the second horizontal portion, and the second vertical portion may not be directly connected to the first horizontal portion.

The display device may further include: a data line crossing the first horizontal portion and the second horizontal portion; a short-circuited point at which the data line and the storage electrode line are short circuited and at where the data line crosses the first horizontal portion; and an incised point at which the first horizontal portion is incised on respective sides of the short-circuited point.

The display device may further include: a data line crossing the first horizontal portion and the second horizontal portion; a short-circuited point at which the data line and the storage electrode line are short circuited and at where the data line crosses the second horizontal portion; and an incised point at which the second horizontal portion is incised on respective sides of the short-circuited point.

The display device may further include a transistor including a drain electrode connected to the pixel electrode, wherein the first horizontal portion includes an extension to form a storage capacitor by overlapping a drain electrode of the transistor.

The display device may further include a gate line extending in the first direction and electrically connected to the pixel electrode, wherein the storage electrode line is physically separated from the gate line and is formed on a same layer as the gate line.

The first horizontal portion may be between the gate line and the pixel electrode.

Another embodiment of the present invention provides a display device including: a first pixel electrode of a first color pixel; a second pixel electrode of a second color pixel; a third pixel electrode of a third color pixel; and a storage electrode line arranged to surround the first pixel electrode, the second pixel electrode, and the third pixel electrode, wherein the storage electrode line may include a first horizontal portion arranged at or near lower portions of the first pixel electrode, the second pixel electrode, and the third pixel electrode, and extending in a first direction, a second horizontal portion arranged at or near upper portions of the first pixel electrode, the second pixel electrode, and the third pixel electrode, and extending in the first direction, a plurality of first vertical portions arranged at or near respective right sides of the first pixel electrode, the second pixel electrode, and the third pixel electrode, and extending toward the second horizontal portion from the first horizontal portion, and a plurality of second vertical portions arranged at or near respective left sides of the first pixel electrode, the second pixel electrode, and the third pixel electrode, and extending toward the first horizontal portion from the second horizontal portion, and wherein the plurality of second vertical portions are not directly connected to the first horizontal portion, and a first vertical portion arranged at or near the third pixel electrode from among the plurality of first vertical portions is directly connected to the second horizontal portion.

From among the plurality of first vertical portions, a first vertical portion arranged at or near the first pixel electrode and a first vertical portion arranged at or near the second pixel electrode may not be directly connected to the second horizontal portion.

The display device may further include: a plurality of data lines crossing the first horizontal portion and the second horizontal portion; a short-circuited point at which a data line, from among the plurality of data lines, and the storage electrode line are short circuited and at where the data line crosses the first horizontal portion; and an incised point at which the first horizontal portion is incised on respective sides of the short-circuited point.

The display device may further include: a plurality of data lines crossing the first horizontal portion and the second horizontal portion; a short-circuited point at which a data line, from among the plurality of data lines, and the storage electrode line are short circuited and at where the data line crosses the second horizontal portion between the first pixel electrode and the second pixel electrode or between the second pixel electrode and the third pixel electrode; and an incised point at which the second horizontal portion is incised on respective sides of the short-circuited point.

The display device may further include: a plurality of data lines crossing the first horizontal portion and the second horizontal portion; a short-circuited point at which a data line, from among the plurality of data lines, and the storage electrode line are short circuited and at where the data line crosses the second horizontal portion between the first pixel electrode and the third pixel electrode; and an incised point at which the second horizontal portion is incised on respective sides of the short-circuited point and the first vertical portion arranged at the third pixel electrode is incised from the first horizontal portion.

Another embodiment of the present invention provides a method for repairing a display device including a pixel electrode, a storage electrode line arranged to surround the pixel electrode, and a data line crossing the storage electrode line, wherein the storage electrode line includes a first horizontal portion arranged at or near a lower portion of the pixel electrode and extending in a first direction, a second horizontal portion arranged at or near an upper portion of the pixel electrode and extending in the first direction, a first vertical portion extending toward the second horizontal portion from the first horizontal portion, and a second vertical portion extending toward the first horizontal portion from the second horizontal portion, and wherein the first vertical portion is not directly connected to the second horizontal portion, and/or the second vertical portion is not directly connected to the first horizontal portion, the method including, when a first short circuit point of the data line and the storage electrode line is generated at where the data line crosses the first horizontal portion, incising the first horizontal portion on respective sides of the first short circuited point.

The method may further include, when a second short circuit point of the data line and the storage electrode line is generated at where the data line crosses the second horizontal portion, incising the second horizontal portion on respective sides of the second short circuited point.

When the pixel electrode is a pixel electrode of a red pixel or a green pixel, the first vertical portion may not be directly connected to the second horizontal portion, and the second vertical portion may not be directly connected to the first horizontal portion.

When the pixel electrode is a pixel electrode of a blue pixel, the first vertical portion may be directly connected to the second horizontal portion, and the second vertical portion may not be directly connected to the first horizontal portion.

The method may further include incising the first vertical portion from the first horizontal portion.

In embodiments of the present invention, the short circuit defect among wires generated in a process for manufacturing a display device may be fixed or solved. Particularly, in the case of the defect in which the mesh-structured storage electrode line is short-circuited with the data line, the short circuit defect may be fixed or solved by a process of incising at least twice (i.e., an incising act is performed at least twice).

BRIEF DESCRIPTION OF THE DRAWINGS

FIG. 6 shows a top plan view for describing a method for repairing the display device shown in FIG. 2.

FIG. 7 shows a top plan view of a pixel of a display device.

FIG. 8 shows a top plan view for describing a method for repairing the display device shown in FIG. 7.

DETAILED DESCRIPTION

Figure 1:
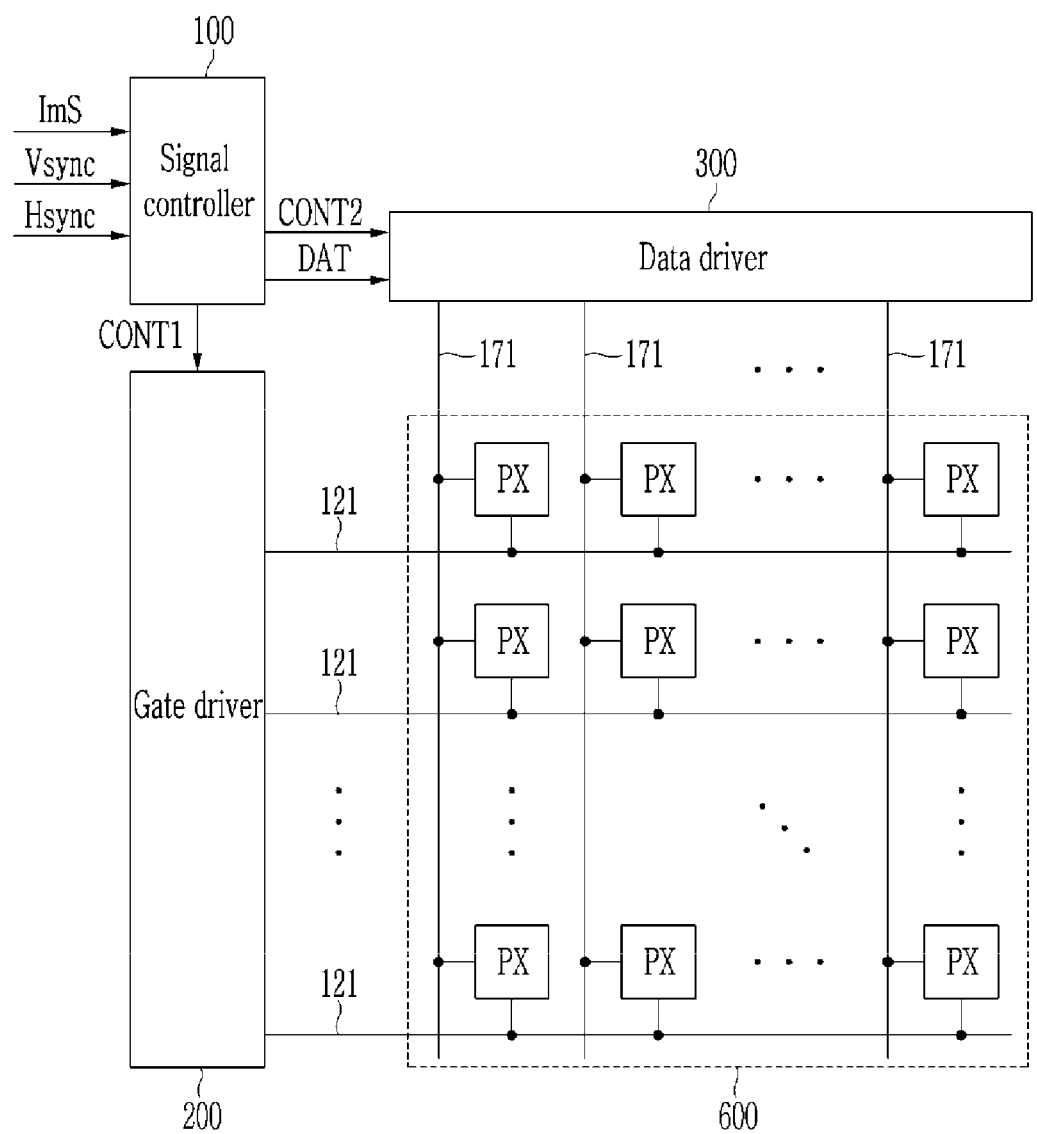
FIG. 1 shows a block diagram of a display device.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description should be regarded as illustrative in nature and not restrictive, and like reference numerals designate like elements throughout the specification.

The size and thickness of each configuration shown in the drawings are arbitrarily shown for better understanding and ease of description, and the present invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening element(s) may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

Unless explicitly described to the contrary, the word "comprise" and variations such as "comprises" or "comprising" will be understood to imply the inclusion of stated elements but not the exclusion of any other elements.

The phrase "on a plane" means viewing the object portion from the top, and the phrase "on a cross-section" means viewing a cross-section of which the object portion is vertically cut from the side.

Expressions such as "at least one of," when preceding a list of elements, modify the entire list of elements and do not modify the individual elements of the list. Further, the use of "may" when describing embodiments of the inventive concept refers to "one or more embodiments of the inventive concept." Also, the term "exemplary" is intended to refer to an example or illustration.

It will be understood that when an element or layer is referred to as being "on," "connected to," "coupled to," or "adjacent to" another element or layer, it can be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

As used herein, the terms "substantially," "about," and similar terms are used as terms of approximation and not as terms of degree, and are intended to account for the inherent deviations in measured or calculated values that would be recognized by those of ordinary skill in the art.

A display device according to an exemplary embodiment will now be described with reference to FIG. 1.

FIG. 1 shows a block diagram of a display device.

Referring to FIG. 1, the display device includes a signal controller 100, a gate driver 200, a data driver 300, and a display unit 600. The display device may be a liquid crystal display, and the liquid crystal display may further include a backlight unit (not shown) for outputting light toward the display unit 600.

The signal controller 100 receives an input image signal ImS and a synchronization signal provided by an external device. The input image signal ImS includes luminance information of a plurality of pixels. The luminance may include a predetermined number (e.g., 1024 ($=2^{10}$), 256 ($=2^8$) or 64 ($=2^6$)) of gray levels. The synchronization signal may include a horizontal synchronizing signal Hsync and a vertical synchronization signal Vsync.

The signal controller 100 generates a first driving control signal CONT1, a second driving control signal CONT2, and an image data signal DAT according to an input image signal ImS and a synchronization signal.

The signal controller 100 may distinguish the input image signal ImS for each frame according to a vertical synchronization signal Vsync, and may distinguish the input image signal ImS for each gate line according to the horizontal synchronizing signal Hsync to generate the image data signal DAT. The signal controller 100 transmits a first driving control signal CONT1 to the gate driver 200. The signal controller 100 transmits the image data signal DAT to the data driver 300 together with the second driving control signal CONT2.

The display unit 600 is a display area (or display region) including a plurality of pixels PX. The display unit 600 includes a plurality of gate lines 121 and a plurality of data lines 171 connected to a plurality of pixels PX. A plurality of gate lines 121 may substantially extend in a row direction to be substantially parallel to each other. A plurality of data lines 171 may substantially extend in a column direction to be substantially parallel to each other. The row direction may be a first direction (refer to DR1 of FIG. 2) or a horizontal direction in a plan view, and the column direction may be a second direction (refer to DR2 of FIG. 2) or a vertical direction in a plan view. The second direction crosses the first direction and it may be perpendicular to the first direction. The display unit 600 may further include a plurality of storage electrode lines (refer to 131 of FIG. 2) extending in the row direction. The storage electrode line will be described in a latter portion of the present specification with reference to FIG. 2.

Respective pixels PX may emit one of primary colors. The primary colors may exemplarily include red, green, and blue, and desired colors may be displayed by a spatial sum and/or a temporal sum of the three primary colors. A color may be displayed by a red pixel, a green pixel, and a blue pixel, and a combination of the red pixel, the green pixel, and the blue pixel may be referred to as a pixel.

The gate driver 200 is connected to a plurality of gate lines 121. The gate driver 200 may generate a plurality of gate signals according to a first driving control signal CONT1, and may sequentially apply a gate signal with a gate-on voltage to a plurality of gate lines 121. The gate driver 200 may be formed in a peripheral area through a same process as an electronic element such as a transistor in the display area. The peripheral area may be a residual region for surrounding the display area in which a plurality of pixels PX are formed on the substrate. According to an exemplary embodiment, the gate driver 200 may be mounted on a flexible printed circuit film or a printed circuit board electrically connected to the substrate.

The data driver 300 is connected to a plurality of data lines 171. The data driver 300 samples and holds the image data signal DAT according to a second driving control signal CONT2, and applies a data voltage to a plurality of data lines 171. The data driver 300 is synchronized when a plurality of gate signals respectively become a gate-on voltage, and it may apply a data voltage caused by the image data signal DAT to a plurality of data lines 171. The data driver 300 may be mounted in a form of a plurality of driving chips in the peripheral area of the substrate, or it may be mounted on the flexible printed circuit film or the printed circuit board electrically connected to the substrate.

A structure of a display device will now be described with reference to FIG. 2 and FIG. 3.

Figure 2:
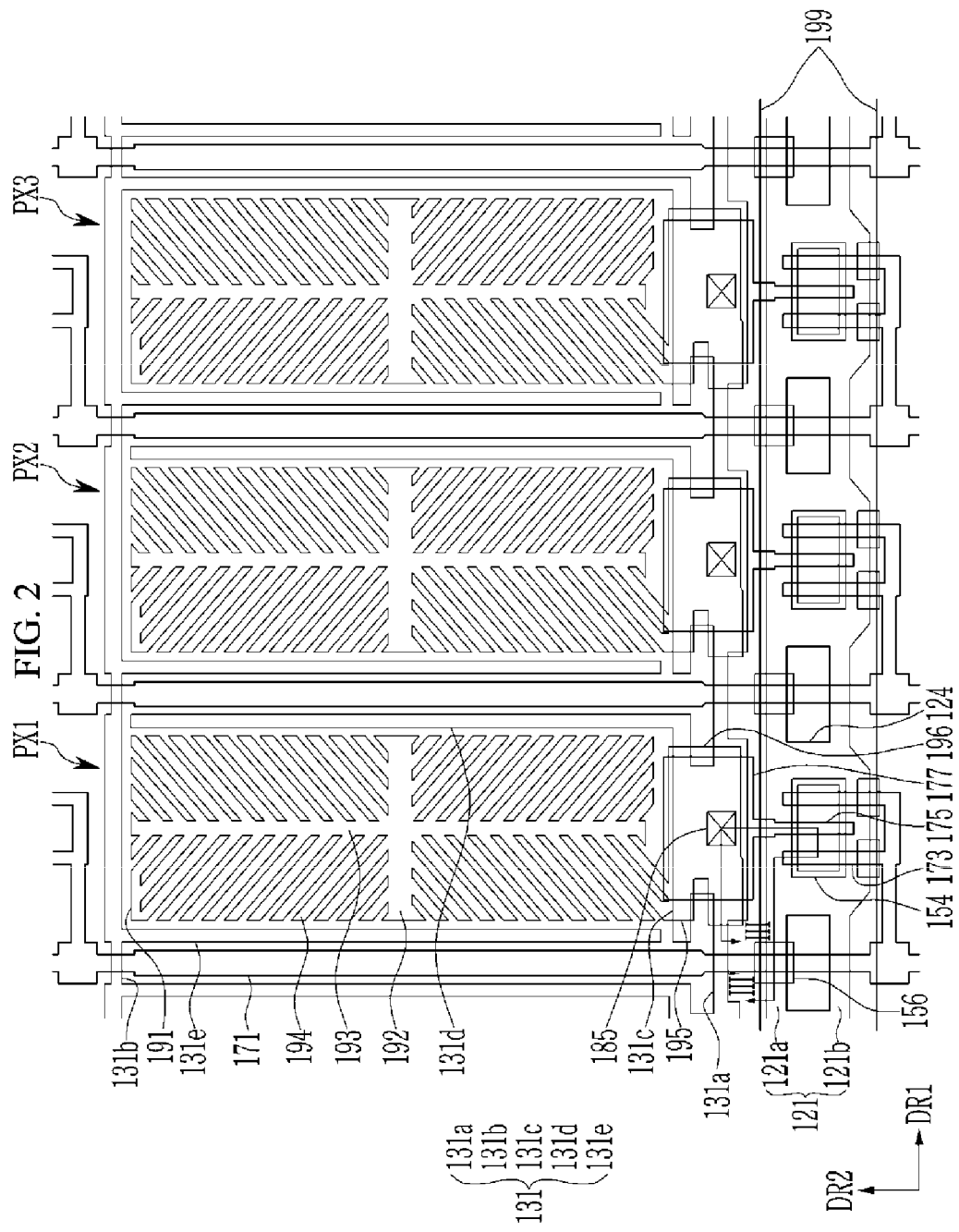
FIG. 2 shows a top plan view of a pixel of a display device.

FIG. 2 shows a top plan view of a pixel of a display device. FIG. 3 shows a cross-sectional view of the display device with respect to a line III-III' of FIG. 2.

Figure 3:
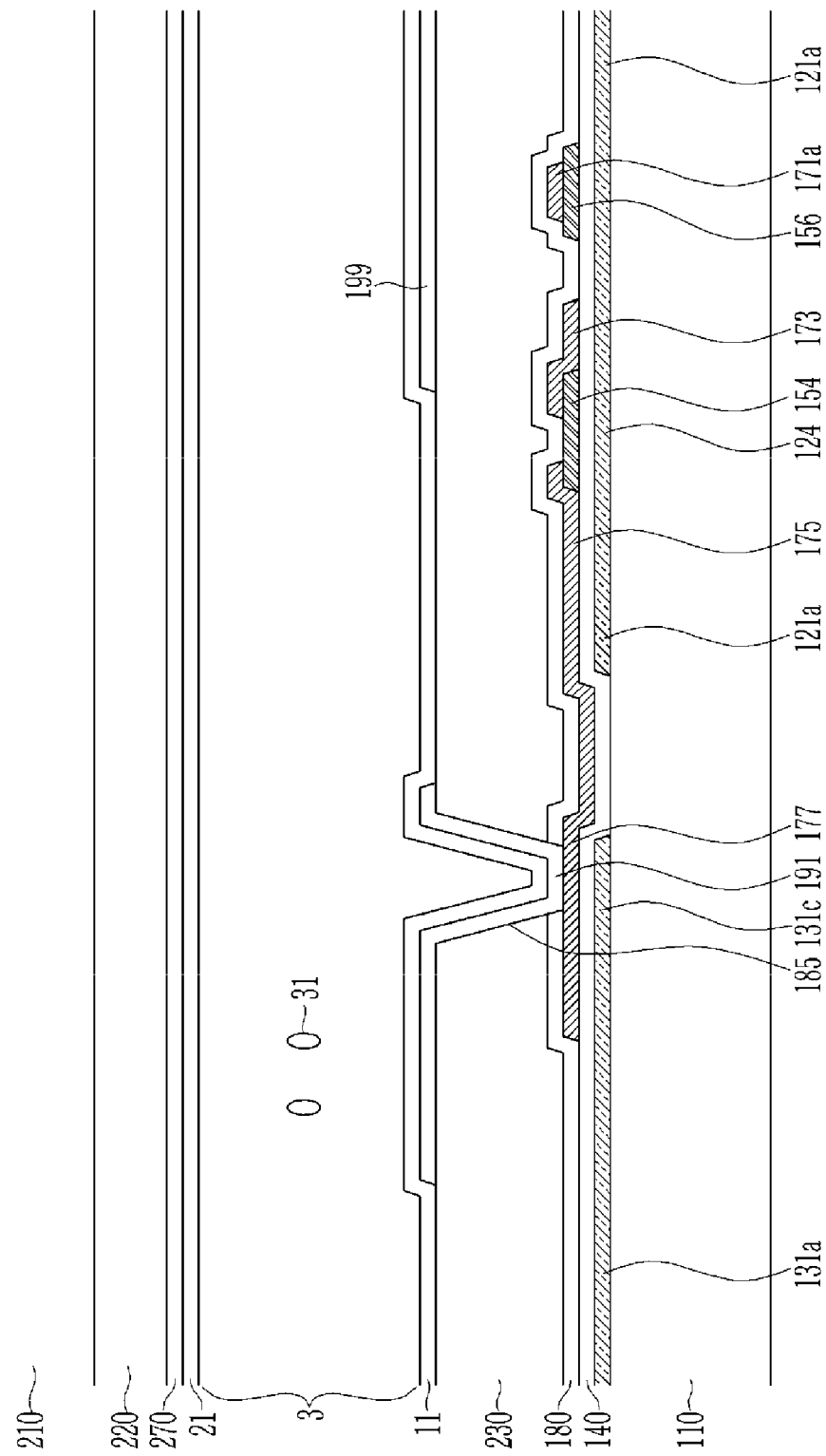
FIG. 3 shows a cross-sectional view of the display device with respect to a line III-III' of FIG. 2.

Referring to FIG. 2 and FIG. 3, the display device includes a first substrate 110, a second substrate 210, and a liquid crystal layer 3 arranged between the first substrate 110 and the second substrate 210.

A gate conductive layer including a gate line 121, a gate electrode 124, and a storage electrode line 131 is arranged on the first substrate 110. The gate conductive layer may include a metal (such as copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), or an alloy thereof).

The gate line 121 may include a first gate line 121*a* and a second gate line 121*b*. The first gate line 121*a* and the second gate line 121*b* extend in parallel to a first direction DR1, and a gate electrode 124 may be connected between the first gate line 121*a* and the second gate line 121*b*.

The storage electrode line 131 is physically separated from the gate line 121 and the gate electrode 124, and it may transmit a constant voltage such as a common voltage. The storage electrode line 131 is arranged on the first substrate 110, and it may be formed on a same layer with a same material as the gate line 121. The storage electrode line 131 may extend in the first direction DR1 in parallel with the gate line 121.

The storage electrode line 131 includes a first horizontal portion 131*a* arranged at or near a lower portion of a pixel electrode 191 in a plan view and extending in the first direction DR1, a second horizontal portion 131*b* arranged at or near an upper portion of the pixel electrode 191 in a plan view and extending in the first direction DR1, an extension 131*c* that is an extended portion of part of the first horizontal portion 131*a*, a first vertical portion 131*d* extending toward the second horizontal portion 131*b* from the extension 131*c*, and a second vertical portion 131*e* extending toward the first horizontal portion 131*a* from the second horizontal portion 131*b*. The first horizontal portion 131*a* may be arranged between the gate line 121 and the pixel electrode 191 in a plan view. The extension 131*c* is a portion of the first horizontal portion 131*a* extended to the second horizontal portion 131*b*, and it may be included in the first horizontal portion 131*a*. The first vertical portion 131*d* may be arranged at or near a right side of the pixel electrode 191 in a plan view, and the second vertical portion 131*e* may be arranged at or near a left side of the pixel electrode 191 in a plan view. That is, the storage electrode line 131 may be arranged to surround four sides of the pixel electrode 191 in a plan view.

Regarding the first pixel PX1 and the second pixel PX2, the first vertical portion 131*d* extends in the second direction DR2 so as to be arranged at or near the second horizontal portion 131*b*, and it is not directly connected to the second horizontal portion 131*b*. Regarding the first pixel PX1 and the second pixel PX2, the second vertical portion 131*e* extends in the second direction DR2 so as to be arranged at or near the extension 131*c* or the first horizontal portion 131*a*, and it is not directly connected to the first horizontal portion 131*a*.

Regarding the third pixel PX3, the first vertical portion 131*d* extends in the second direction DR2 to be directly connected to the second horizontal portion 131*b*, and the second vertical portion 131*e* extends in the second direction DR2 so as to be arranged at or near the first horizontal portion 131*a* but it is not directly connected to the first horizontal portion 131*a*.

A constant voltage such as a common voltage may be applied to at least one of the first horizontal portion 131*a* and the second horizontal portion 131*b* of the storage electrode line 131 from an outside of the display area. The first vertical portion 131*d* of the third pixel PX3 electrically connects the first horizontal portion 131*a* to the second horizontal portion 131*b*. When the common voltage is applied to one of the first horizontal portion 131*a* and the second horizontal portion 131*b*, the common voltage may be applied to the first horizontal portion 131*a* and the second horizontal portion 131*b* by the first vertical portion 131*d* of the third pixel PX3. In other words, the first vertical portion 131*d* of the third pixel PX3 together with the first horizontal portion 131*a* and the second horizontal portion 131*b* may configure a storage electrode line 131 in a mesh form.

The first to third pixels PX1, PX2, and PX3 may emit light with different colors. For example, the first pixel PX1 may be a red pixel for emitting red light, the second pixel PX2 may be a green pixel for emitting green light, and the third pixel PX3 may be a blue pixel for emitting blue light. In the display area, the first pixel PX1, the second pixel PX2, and the third pixel PX3 may be sequentially repeatedly arranged in the first direction DR1.

A gate insulating layer 140 is arranged on the gate conductive layer. The gate insulating layer 140 may include an inorganic insulating material such as a silicon nitride (SiNx) or a silicon oxide (SiOx).

A semiconductor layer including a channel semiconductor 154 and a step preventing semiconductor 156 is arranged on the gate insulating layer 140. The semiconductor layer may include amorphous silicon, polysilicon, or an oxide semiconductor. The channel semiconductor 154 may overlap the gate electrode 124.

A data conductive layer including a data line 171, a source electrode 173, and a drain electrode 175 is arranged on the gate insulating layer 140 and the semiconductor layer. The data conductive layer may include a metal such as copper (Cu), aluminum (Al), magnesium (Mg), silver (Ag), gold (Au), platinum (Pt), palladium (Pd), nickel (Ni), neodymium (Nd), iridium (Ir), molybdenum (Mo), tungsten (W), titanium (Ti), chromium (Cr), tantalum (Ta), or an alloy thereof.

The data line 171 extends in the second direction DR2 to cross the gate line 121, and it may include a source electrode 173. The data line 171 may extend in the second direction DR2 between the nearby first vertical portion 131*d* of the storage electrode line 131 and the second vertical portion 131*e* to cross the first horizontal portion 131*a* and the second horizontal portion 131*b* of the storage electrode line 131. The source electrode 173 may be formed to have a shape extending from the data line 171. For example, the source electrode 173 may be formed to have a shape extending in the first direction DR1 from the data line 171 and extending substantially in a U shape toward the gate electrode 124. However, the source electrode 173 may be formed to have various shapes, and is not limited thereto.

The step preventing semiconductor 156 may be arranged on a portion where the gate conductive layer crosses the data line 171. The step preventing semiconductor 156 may prevent the data line 171 from being disconnected by a step generated by the gate conductive layer.

The drain electrode 175 is physically separated from the data line 171 and the source electrode 173. The drain electrode 75 may include a portion facing the source electrode 173, and an extension 177 in a region overlapping the gate electrode 124. A region between the source electrode 173 and the drain electrode 175 facing each other may overlap the channel semiconductor 154. The extension 177 extends to overlap the storage electrode line 131, and it may overlap the extension 131*c* of the storage electrode line 131. The extension 177 may overlap the extension 131*c* of the storage electrode line 131 with the gate insulating layer 140 therebetween to form a storage capacitor Cst. The storage capacitor Cst may maintain a voltage applied to the drain electrode 175 and the pixel electrode 191 connected to the same when the data voltage is not applied to the drain electrode 175 and the pixel electrode 191 from the data line 171.

The gate electrode 124, the source electrode 173, and the drain electrode 175 may configure a thin film transistor that is a switching element together with the channel semiconductor 154. A channel of the thin film transistor is formed on the channel semiconductor 154 between the source electrode 173 and the drain electrode 175.

A passivation layer 180 is arranged on the data conductive layer and the exposed semiconductor layer. The passivation layer 180 may include an inorganic insulating material such as a silicon nitride (SiNx) or a silicon oxide (SiOx).

A color filter layer 230 may be arranged on the passivation layer 180. The color filter layer 230 may include an inorganic insulating material or an organic insulating material. The color filter layer 230 may uniquely display one of the primary colors.

The passivation layer 180 and the color filter layer 230 may include a contact hole 185 formed in the extension 177 of the drain electrode 175.

A pixel electrode layer including a pixel electrode 191 and a shielding electrode 199 may be arranged on the color filter layer 230. The pixel electrode layer may include a transparent conductive material such as an indium tin oxide (ITO) or an indium zinc oxide (IZO), or a metal such as aluminum (Al), silver (Ag), chromium (Cr), or an alloy thereof. The pixel electrode 191 may be physically and electrically connected to the drain electrode 175 through the contact hole 185 to receive a data voltage from the drain electrode 175.

The pixel electrode 191 may correspond to the pixel area in which one pixel displays an image, and the overall shape of the pixel electrode 191 may be quadrangular. The pixel electrode 191 may include a pattern from which a portion is removed. According to the pattern, the pixel electrode 191 may include a horizontal stem 192, a vertical stem 193, a plurality of fine branches 194, a connector 195, and an extension 196.

The horizontal stem 192 may extend in the first direction DR1, the vertical stem 193 may extend in the second direction DR2, and the horizontal stem 192 and the vertical stem 193 may form a cross shape. The pixel electrode 191 is divided into four sub-regions by the horizontal stem 192 and the vertical stem 193, and a plurality of fine branches 194 connected to the horizontal stem 192 or the vertical stem 193 may be arranged in the respective sub-regions.

The fine branches 194 may form an angle of about 40 to 45 degrees with respect to the horizontal stem 192 or the gate line 121. The fine branches 194 of the two neighboring sub-regions may be orthogonal to each other. An electrode is removed between the neighboring fine branches 194, which will be referred to as a fine slit.

The connector 195 may be connected to the fine branches 194 of one of the four sub-regions of the pixel electrode 191. The extension 196 of the pixel electrode 191 is a portion extended to overlap the extension 177 of the drain electrode 175 from the connector 195. The extension 196 of the pixel electrode 191 may be physically and electrically connected to the drain electrode 175 through a contact hole 185.

As exemplified with reference to FIG. 2, end portions of right and left edges of the pixel electrode 191 may not overlap the first vertical portion 131d and the second vertical portion 131e of the storage electrode line 131. Differing from this, according to exemplary embodiments, the end portions of right and left edges of the pixel electrode 191 may overlap at least one of the first vertical portion 131d and the second vertical portion 131e of the storage electrode line 131.

The shielding electrode 199 may be separated from the pixel electrode 191 and may substantially extend in the first direction DR1. The shielding electrode 199 may overlap the gate line 121. The shielding electrode 199 may receive the same voltage as the common electrode 270. An electric field is not generated between the shielding electrode 199 and the common electrode 270, and the liquid crystal therebetween may express (or display) black. As described, when liquid crystal molecules 31 express black, the liquid crystal molecules 31 may function as a light blocking portion.

A light blocking portion 220 may be arranged below the second substrate 210. The light blocking portion 220 may prevent (or protect from) leakage of light between neighboring pixel electrodes 191. Particularly, the light blocking portion 220 may be arranged in a region between the neighboring pixel electrodes 191.

A common electrode 270 may be arranged below the light blocking portion 220. The common electrode 270 may be continuously formed in most of a region corresponding to the display area (DA). The common electrode 270 may include a transparent conductive material such as an ITO or an IZO, or a metal such as aluminum (Al), silver (Ag), chromium (Cr), or an alloy thereof, in a like manner of the pixel electrode layer. According to an exemplary embodiment, the common electrode 270 may be patterned to include a slit or a cutout.

It has been described that the color filter layer 230 is arranged on the first substrate 110, and according to exemplary embodiments, the color filter layer 230 may be arranged not on the first substrate 110 but between the second substrate 210 and the common electrode 270.

The liquid crystal layer 3 may include liquid crystal molecules 31 with negative dielectric anisotropy. The liquid crystal molecules 31 may be aligned such that a long axis thereof may be inclined to be perpendicular with respect to sides of the first substrate 110 and the second substrate 210, or may be inclined by a set or predetermined angle with respect to the perpendicular direction while there is no electric field applied to the liquid crystal layer 3. The liquid crystal molecules 31 may be pre-tilted by a fringe field or a step between edges of patterned portions (e.g., a fine branch 194) of the pixel electrode 191 and the common electrode 270.

A first alignment layer 11 may be arranged on the pixel electrode 191 and the color filter layer 230, and a second alignment layer 21 may be arranged on the common electrode 270. The first alignment layer 11 and the second alignment layer 12 may be vertical alignment layers. The liquid crystal layer 3 is arranged between the first alignment layer 11 and the second alignment layer 12. A plurality of polymer protrusions formed when reactive monomers (RM) react with light such as ultraviolet rays may be arranged on sides of the first alignment layer 11 and the second alignment layer 21 arranged at or near the liquid crystal layer 3. The polymer protrusions may function to maintain the pre-tilt of the liquid crystal molecules 31 of the liquid crystal layer 3.

The pixel electrode 191 to which the data voltage is applied generates an electric field together with the common electrode 270. A disposal direction of the liquid crystal molecules 31 arranged between the pixel electrode 191 and the common electrode 270 is determined by the electric field, and luminance of light passing through the liquid crystal layer 3 may be controlled by the determined direction of the liquid crystal molecules 31.

The data voltage must be applied to the pixel electrode 191. However, a defect in which the data line 171 and the storage electrode line 131 are short circuited may be generated in the region in which the data line 171 crosses the storage electrode line 131 and overlaps the same. In this case, the common voltage and the data voltage may be shorted, so an accurate (or correct) data voltage may not be applied to the pixel electrode 191. When the defect is found after the display device is manufactured, the defect may be fixed or solved through a repairing process, and a good display device may be manufactured.

A method for repairing short circuit defects of a data line 171 and a storage electrode line 131 will now be described with reference to FIG. 4 through FIG. 6.

Figure 4:
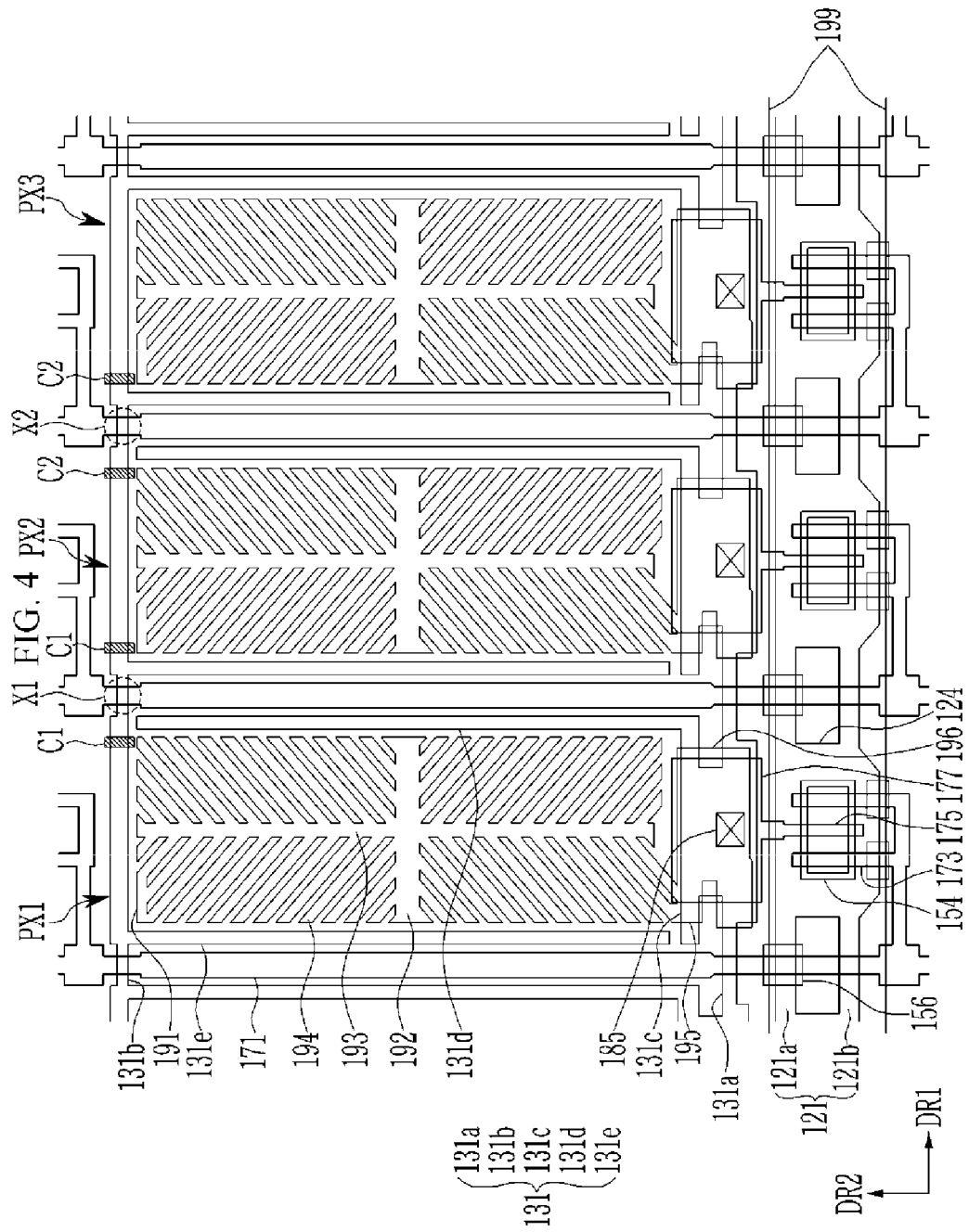
FIG. 4 shows a top plan view for describing a method for repairing the display device shown in FIG. 2.

FIG. 4 shows a top plan view for describing a method for repairing the display device shown in FIG. 2.

Referring to FIG. 4, a short circuit of the data line 171 and the storage electrode line 131 may be generated at the point X1 at which the data line 171 crosses the second horizontal portion 131b of the storage electrode line 131 between the first pixel PX1 and the second pixel PX2. When the short circuit defect is generated, the short circuit defects may be fixed or solved by incising the second horizontal portion 131b of the storage electrode line 131 on respective sides of the short-circuited point X1. That is, by incising the second horizontal portion 131b on the respective sides of the short-circuited point X1, the common voltage is not transmitted to the short-circuited point X1, and the data voltage may be applied to the data line 171. As described, the short circuit defects may be fixed or solved by performing the incising process twice (i.e., an incising act is performed twice) for one short circuit. By the repairing process, two incised points C1 are arranged on the second horizontal portion 131b of the storage electrode line 131.

When a short circuit of the data line 171 and the storage electrode line 131 is generated at the point X2 at which the data line 171 crosses the second horizontal portion 131b of the storage electrode line 131 between the second pixel PX2 and the third pixel PX3, the short circuit defects may be fixed or solved by incising the second horizontal portion 131b of the storage electrode line 131 on the respective sides of the short-circuited point X2 in a like manner. By the repairing process, two incised points C2 are arranged on the second horizontal portion 131b of the storage electrode line 131.

Figure 5:
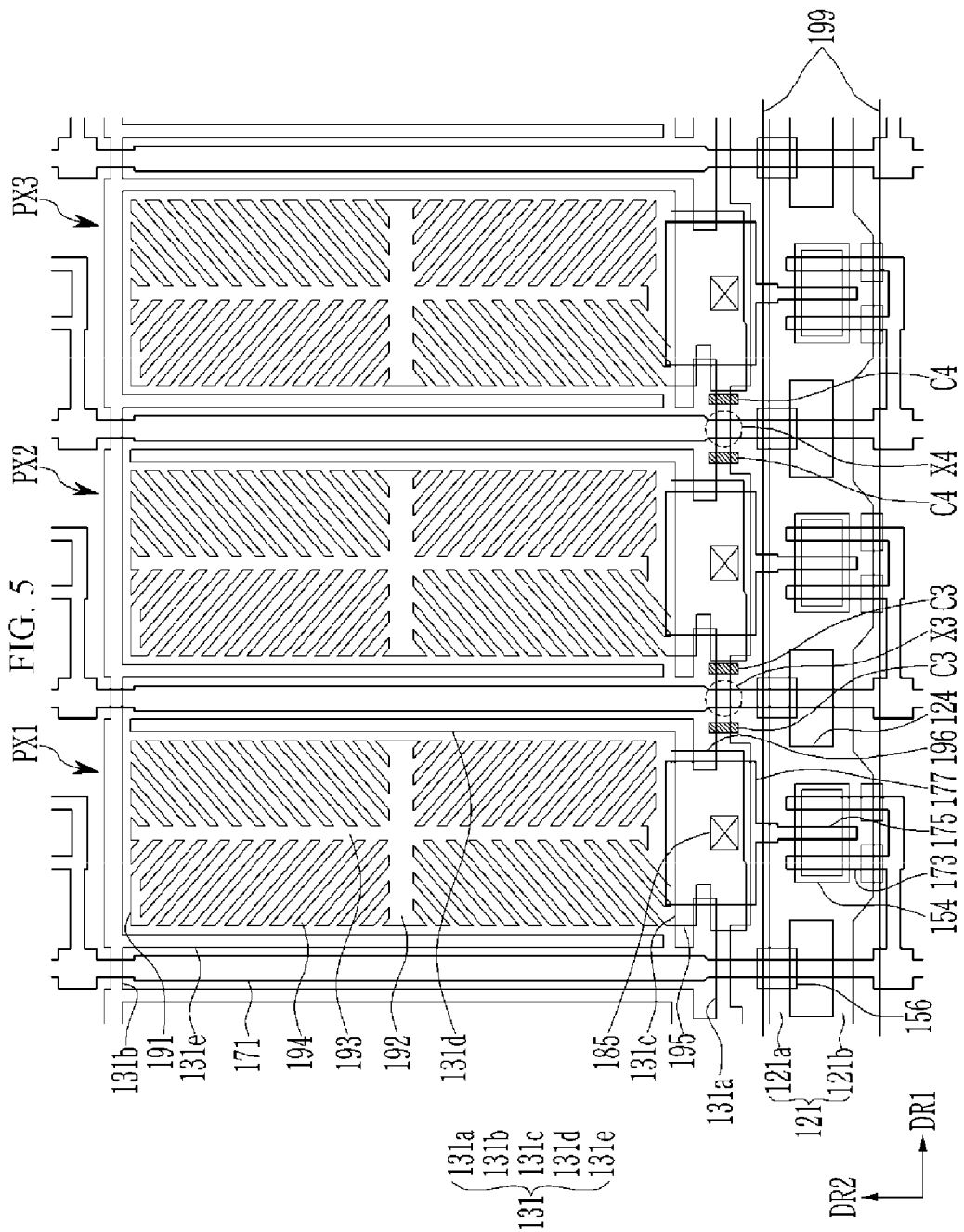
FIG. 5 shows a top plan view for describing a method for repairing the display device shown in FIG. 2.

FIG. 5 shows a top plan view for describing a method for repairing the display device shown in FIG. 2.

Referring to FIG. 5, a short circuit of the data line 171 and the storage electrode line 131 may be generated at the point X3 at which the data line 171 crosses the first horizontal portion 131a of the storage electrode line 131 between the first pixel PX1 and the second pixel PX2. When the short circuit defect is found, the short circuit defect may be fixed or solved by incising the first horizontal portion 131a of the storage electrode line 131 on the respective sides of the short-circuited point X3. That is, by incising the first horizontal portion 131a on the respective sides of the short-circuited point X3, the common voltage is not transmitted to the short-circuited point X3, and the data voltage may be applied to the data line 171. As described, the short circuit defects may be fixed or solved by performing the incising process twice for one short circuit. By the repairing process, two incised points C3 are arranged on the first horizontal portion 131a of the storage electrode line 131.

When a short circuit of the data line 171 and the storage electrode line 131 is generated at the point X4 at which the data line 171 crosses the first horizontal portion 131a of the storage electrode line 131 between the second pixel PX2 and the third pixel PX3, the short circuit defect may be fixed or solved by incising the first horizontal portion 131a of the storage electrode line 131 on respective sides of the short-circuited point X4 in a like manner. By the repairing process, two incised points C4 are arranged on the first horizontal portion 131a of the storage electrode line 131.

FIG. 6 shows a top plan view for describing a method for repairing the display device shown in FIG. 2.

Referring to FIG. 6, a short circuit of the data line 171 and the storage electrode line 131 may be generated at the point X5 at which the data line 171 crosses the second horizontal portion 131b of the storage electrode line 131 between the first pixel PX1 and the third pixel PX3. When the short circuit defect is found, the second horizontal portion 131b of the storage electrode line 131 is incised on the respective sides of the short-circuited point X5, and the first vertical portion 131d arranged at or near the right side of the pixel electrode 191 of the third pixel PX3 is incised from the extension 131c to thus solve the short circuit defect.

The first vertical portion 131d arranged at or near the right side of the pixel electrode 191 of the third pixel PX3 is directly connected to the extension 131c and the second horizontal portion 131b, so a process for incising the first vertical portion 131d from the extension 131c is needed.

When the second horizontal portion 131b is incised between the first vertical portion 131d arranged at or near the right side of the pixel electrode 191 of the third pixel PX3 and the data line 171, there is no need to incise the first vertical portion 131d arranged at or near the right side of the pixel electrode 191 of the third pixel PX3 from the extension 131c. However, an incising space that is equal to or greater than about 6 μm is needed so as to incise the storage electrode line 131, but a gap between the first vertical portion 131d and the data line 171 is less than 6 μm, so while the first vertical portion 131d is connected to the second horizontal portion 131b, the second horizontal portion 131b should be incised on the respective sides of the short-circuited point X5.

The third pixel PX3 is a blue pixel, and the blue pixel needs a storage capacitor with lesser capacitance than the red pixel or the green pixel, so an incising space for incising the extension 131c and the first vertical portion 131d may be obtained on the third pixel PX3.

When the second horizontal portion 131b is incised on the respective sides of the short-circuited point X5, and the first vertical portion 131d is incised from the extension 131c, the common voltage is not transmitted to the short-circuited point X5, and the data voltage may be applied to the data line 171. As described, the short circuit defect at the point X5 at which the data line 171 crosses the second horizontal portion 131b of the storage electrode line 131 between the first pixel PX1 and the third pixel PX3 may be fixed or solved by performing an incising process three times (i.e., an incising act is performed three times). That is, by the repairing process, two incised points C5 are arranged on the second horizontal portion 131b of the storage electrode line 131, and one incised point C5 is arranged between the extension 131c and the first vertical portion 131d.

When a short circuit of the data line 171 and the storage electrode line 131 is generated at the point X6 at which the data line 171 crosses the first horizontal portion 131a of the storage electrode line 131 between the first pixel PX1 and the third pixel PX3, the short circuit defect may be fixed or solved by incising the first horizontal portion 131a of the storage electrode line 131 on the respective sides of the short-circuited point X6. By the repairing process, two incised points C6 are arranged on the first horizontal portion 131a of the storage electrode line 131.

As described above, the storage electrode line 131 is formed in a mesh structure so that the common voltage applied to the storage electrode line 131 may be uniformly applied to a plurality of pixels PX, and the short circuit defect may be fixed or solved by performing an incising process at least twice on the defect at which the storage electrode line 131 is short circuited with the data line 171.

A pixel of a display device according to another exemplary embodiment of the present invention will now be described with reference to FIG. 7, and a method for repairing a display device of FIG. 7 will be described with reference to FIG. 8. Differences will be mainly described in comparison with exemplary embodiments of FIG. 2 to FIG. 6.

FIG. 7 shows a top plan view of a pixel of a display device.

Referring to FIG. 7, regarding first to third pixels PX1, PX2, and PX3, the first vertical portion 131d extends toward the second horizontal portion 131b from the extension 131c and is directly connected to the second horizontal portion 131b. Regarding the first to third pixels PX1, PX2, and PX3, the second vertical portion 131e extends toward the extension 131c or the first horizontal portion 131a from the second horizontal portion 131b and is directly connected to the first horizontal portion 131a.

That is, regarding the first to third pixels PX1, PX2, and PX3, the first vertical portion 131d and the second vertical portion 131e electrically connect the first horizontal portion 131a to the second horizontal portion 131b. In other words, the first horizontal portion 131a, the second horizontal portion 131b, the first vertical portion 131d, and the second vertical portion 131e of the first to third pixels PX1, PX2, and PX3 may configure a mesh-type storage electrode line 131.

Except for the differences, characteristics of the exemplary embodiment described with reference to FIG. 1 to FIG. 3 are applicable to the exemplary embodiment described with reference to FIG. 7, so descriptions on the repeated characteristics of the exemplary embodiment described with reference to FIG. 1 to FIG. 3 may not be provided again.

FIG. 8 shows a top plan view for describing a method for repairing the display device shown in FIG. 7.

Referring to FIG. 8, when the data line 171 and the storage electrode line 131 are short circuited at a point X1' where the data line 171 crosses the second horizontal portion 131b of the storage electrode line 131 between the first pixel PX1 and the second pixel PX2, the second horizontal portion 131b of the storage electrode line 131 is incised on respective sides of the short-circuited point X1', the first vertical portion 131d arranged at or near the data line 171 is incised from the extension 131c, and the second vertical portion 131e arranged at or near the data line 171 is incised from the extension 131c to solve the short circuit defect. By the repairing process, two incised points C1' at the first horizontal portion 131a and two incised points C1' at the second horizontal portion 131b are respectively formed or generated. That is, four incised points C1' are formed or generated by one short circuit.

When a short circuit defect of the data line 171 and the second horizontal portion 131b of the storage electrode line 131 is generated between the second pixel PX2 and the third pixel PX3 or between the first pixel PX1 and the third pixel PX3, the short circuit defect may be fixed or solved by incising four portions in a like manner.

When a short circuit of the data line 171 and the storage electrode line 131 is generated at the point X2' at which the data line 171 crosses the first horizontal portion 131a of the storage electrode line 131 between the second pixel PX2 and the third pixel PX3, the short circuit defect may be fixed or solved by incising the first horizontal portion 131a of the storage electrode line 131 on respective sides of the short-circuited point X2'. By the repairing process, two incised points C2' are arranged on the first horizontal portion 131a of the storage electrode line 131.

When a short circuit of the data line 171 and the first horizontal portion 131a of the storage electrode line 131 is generated between the first pixel PX1 and the second pixel PX2 or between the first pixel PX1 and the third pixel PX3, the short circuit defect may be fixed or solved by incising two portions in a like manner.

In an exemplary embodiment described with reference to FIG. 7 and FIG. 8, when the data line 171 and the second horizontal portion 131b of the storage electrode line 131 are short circuited, four portions must be incised. However, in an exemplary embodiment described with reference to FIG. 2 to FIG. 6, when the data line 171 and the second horizontal portion 131b of the storage electrode line 131 are short circuited between the first pixel PX1 and the third pixel PX3, three portions need to be incised, and in other cases, two portions are incised, thereby fixing or solving the short circuit defect. That is, compared to the exemplary embodiment described with reference to FIG. 7 and FIG. 8, the exemplary embodiment described with reference to FIG. 2 through FIG. 6 may reduce the number of incisions on the short circuit defects and may reduce the time for performing a repairing process.

Further, in the exemplary embodiment of FIG. 7 and FIG. 8, when the data line 171 and the second horizontal portion 131b of the storage electrode line 131 are short circuited, regarding the pixels, the first vertical portion 131d and the second vertical portion 131e should be incised from the extension 131c. For this, a size of the extension 131c of the storage electrode line 131 may be limited so as to acquire the incising space that is equal to or greater than 6 μm for all the pixels. In contrast, according to the exemplary embodiment of FIG. 2 through FIG. 6, when the data line 171 and the second horizontal portion 131b of the storage electrode line 131 are short circuited between the first pixel PX1 and the third pixel PX3, the first vertical portion 131d is incised from the extension 131c on the third pixel PX3, so there is no need to acquire or form the incising space for the repairing process on the first pixel PX1 and the second pixel PX2, and the size of the extension 131c of the storage electrode line 131 is not limited.

While this invention has been described in connection with what are presently considered to be practical exemplary embodiments, it is to be understood that the invention is not limited to the disclosed embodiments. On the contrary, it is intended to cover various modifications and equivalent arrangements included within the spirit and scope of the appended claims, and equivalents thereof.

What is claimed is:

1. A display device comprising:
   a pixel electrode; and
   a storage electrode line arranged to surround the pixel electrode,
   wherein the storage electrode line comprises:
      a first horizontal portion arranged at a lower portion of the pixel electrode and extending in a first direction,
      a second horizontal portion arranged at an upper portion of the pixel electrode and extending in the first direction, the first horizontal portion and second horizontal portion being formed from the same storage electrode line,
a first vertical portion extending toward the second horizontal portion from the first horizontal portion, and
a second vertical portion extending toward the first horizontal portion from the second horizontal portion,
wherein the first horizontal portion and the second horizontal portion are electrically connected to each other and receive a same voltage, and
wherein the first vertical portion is not directly connected to the second horizontal portion, and/or the second vertical portion is not directly connected to the first horizontal portion.

2. The display device of claim 1, wherein:
when the pixel electrode is a pixel electrode of a blue pixel, the first vertical portion is directly connected to the second horizontal portion, and the second vertical portion is not directly connected to the first horizontal portion.

3. The display device of claim 2, further comprising:
a data line crossing the first horizontal portion and the second horizontal portion;
a short-circuited point at which the data line and the storage electrode line are short circuited and at where the data line crosses the first horizontal portion; and
an incised point at which the first horizontal portion is incised on respective sides of the short-circuited point.

4. The display device of claim 2, further comprising:
a data line crossing the first horizontal portion and the second horizontal portion;
a short-circuited point at which the data line and the storage electrode line are short circuited and at where the data line crosses the second horizontal portion; and
an incised point at which the second horizontal portion is incised on respective sides of the short-circuited point and the first vertical portion is incised from the first horizontal portion.

5. The display device of claim 1, wherein:
when the pixel electrode is a pixel electrode of a red pixel or a green pixel, the first vertical portion is not directly connected to the second horizontal portion, and the second vertical portion is not directly connected to the first horizontal portion.

6. The display device of claim 5, further comprising:
a data line crossing the first horizontal portion and the second horizontal portion;
a short-circuited point at which the data line and the storage electrode line are short circuited and at where the data line crosses the first horizontal portion; and
an incised point at which the first horizontal portion is incised on respective sides of the short-circuited point.

7. The display device of claim 5, further comprising:
a data line crossing the first horizontal portion and the second horizontal portion;
a short-circuited point at which the data line and the storage electrode line are short circuited and at where the data line crosses the second horizontal portion; and
an incised point at which the second horizontal portion is incised on respective sides of the short-circuited point.

8. The display device of claim 1, further comprising:
a transistor comprising a drain electrode connected to the pixel electrode,
wherein the first horizontal portion includes an extension to form a storage capacitor by overlapping a drain electrode of the transistor.

9. The display device of claim 1, further comprising:
a gate line extending in the first direction and electrically connected to the pixel electrode,
wherein the storage electrode line is physically separated from the gate line and is formed on a same layer as the gate line.

10. The display device of claim 9, wherein
the first horizontal portion is between the gate line and the pixel electrode.

11. A display device comprising:
a first pixel electrode of a first color pixel;
a second pixel electrode of a second color pixel;
a third pixel electrode of a third color pixel; and
a storage electrode line arranged to surround the first pixel electrode, the second pixel electrode, and the third pixel electrode,
wherein the storage electrode line comprises:
a first horizontal portion arranged at lower portions of the first pixel electrode, the second pixel electrode, and the third pixel electrode, and extending in a first direction,
a second horizontal portion arranged at upper portions of the first pixel electrode, the second pixel electrode, and the third pixel electrode, and extending in the first direction, the first horizontal portion and second horizontal portion being formed from the same storage electrode line,
a plurality of first vertical portions arranged at respective right sides of the first pixel electrode, the second pixel electrode, and the third pixel electrode, and extending toward the second horizontal portion from the first horizontal portion, and
a plurality of second vertical portions arranged at respective left sides of the first pixel electrode, the second pixel electrode, and the third pixel electrode, and extending toward the first horizontal portion from the second horizontal portion, and
wherein the plurality of second vertical portions are not directly connected to the first horizontal portion, and a first vertical portion arranged at the third pixel electrode from among the plurality of first vertical portions is directly connected to the second horizontal portion.

12. The display device of claim 11, wherein:
from among the plurality of first vertical portions, a first vertical portion arranged at the first pixel electrode and a first vertical portion arranged at the second pixel electrode are not directly connected to the second horizontal portion.

13. The display device of claim 11, further comprising:
a plurality of data lines crossing the first horizontal portion and the second horizontal portion;
a short-circuited point at which a data line, from among the plurality of data lines, and the storage electrode line are short circuited and at where the data line crosses the first horizontal portion; and
an incised point at which the first horizontal portion is incised on respective sides of the short-circuited point.

14. The display device of claim 11, further comprising:
a plurality of data lines crossing the first horizontal portion and the second horizontal portion;
a short-circuited point at which a data line, from among the plurality of data lines, and the storage electrode line are short circuited and at where the data line crosses the second horizontal portion between the first pixel electrode and the second pixel electrode or between the second pixel electrode and the third pixel electrode; and an incised point at which the second horizontal portion is incised on respective sides of the short-circuited point.

15. The display device of claim 11, further comprising:

a plurality of data lines crossing the first horizontal portion and the second horizontal portion;

a short-circuited point at which a data line, from among the plurality of data lines, and the storage electrode line are short circuited and at where the data line crosses the second horizontal portion between the first pixel electrode and the third pixel electrode; and an incised point at which the second horizontal portion is incised on respective sides of the short-circuited point and a first vertical portion arranged at the third pixel electrode is incised from the first horizontal portion.

* * * * *